United States Patent [19]

Shimizu

[11] Patent Number: 4,754,829
[45] Date of Patent: Jul. 5, 1988

[54] MOTOR-DRIVEN POWER STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 35,580

[22] Filed: Apr. 7, 1987

[30] Foreign Application Priority Data

Apr. 11, 1986 [JP] Japan ................................. 61-83454

[51] Int. Cl.$^4$ ............................................. B62D 5/04
[52] U.S. Cl. ..................................... 180/79.1; 180/142
[58] Field of Search ...................... 180/142, 79.1, 141, 180/143

[56] References Cited

U.S. PATENT DOCUMENTS

| | | | |
|---|---|---|---|
| 4,538,698 | 9/1985 | Hashimoto | 180/142 |
| 4,629,952 | 12/1986 | Shimizu | 318/432 |
| 4,639,651 | 1/1987 | Shimizu | 318/432 |
| 4,651,840 | 3/1987 | Shimizu | 180/79.1 |
| 4,656,409 | 4/1987 | Shimizu | 318/689 |
| 4,657,103 | 4/1987 | Shimizu | 180/142 |
| 4,660,669 | 7/1987 | Shimizu | 180/79.1 |
| 4,671,371 | 6/1987 | Shimizu | 180/79.1 |
| 4,671,372 | 6/1987 | Shimizu | 180/79.1 |
| 4,681,181 | 7/1987 | Shimizu | 180/79.1 |
| 4,686,433 | 8/1987 | Shimizu | 180/79.1 |
| 4,688,655 | 8/1987 | Shimizu | 180/79.1 |

FOREIGN PATENT DOCUMENTS

2135642  9/1984  United Kingdom .

Primary Examiner—John J. Love
Assistant Examiner—Donn McGiehan
Attorney, Agent, or Firm—Armstrong, Nikaido, Marmelstein & Kubovcik

[57] ABSTRACT

A motor-driven power steering system for an automotive vehicle has a drive control device for applying a driving signal to an electric motor for generating assistive torque to be applied to an output shaft, based on output signals from a torque detecting mechanism which detects a steering torque acting on an input shaft. The system detects a freely returning state of a steering wheel to dampen the electric motor when prescribed conditions are met. The range of the prescribed conditions is widened as the speed of travel of the automotive vehicle is increased.

5 Claims, 7 Drawing Sheets

MOTOR-DRIVEN POWER STEERING SYSTEM FOR VEHICLES

BACKGROUND OF THE INVENTION

1. Field of the Invention

The present invention relates to a motor-driven power steering system for vehicles such as automobiles, and more particularly to a motor-driven power steering system having a steering servo unit including an electric motor for producing assistive steering torque.

2. Description of the Relevant Art

Various electric or motor-driven power steering systems for automobiles have been proposed in recent years in view of the structural complexities of conventional hydraulically operated power steering systems.

One example of such an automotive motor-driven power steering system is disclosed in UK patent application No. 2,135,642 A published on Sept. 5, 1984. The disclosed motor-driven power steering system has a steering servo unit using a low-torque, high-speed electric motor as a power source and a control apparatus for the steering servo unit. When a steering wheel is turned, the steering torque applied to the input shaft of the steering system which is coupled to the steering wheel is detected, and the motor is controlled by the detected steering torque. In low- and medium-speed ranges, assistive torque is produced by the motor and transmitted via a speed reducer to the output shaft of the steering system. The speed reduction ratio of the speed reducer is selected to be high since the motor rotates at high speed. The assistive torque applied to the output shaft of the steering system helps the driver turn the steering wheel with reduced manual forces, resulting in improved drivability and steering feeling. At a high vehicle speed, the armature winding of the motor is short-circuited at a ratio proportional to the steering torque Ts. Therefore, a damping force is produced in proportion to the steering torque Ts, so that larger steering reactive forces are generated than possible with a manually operated steering system.

In most cases, while a steerable or dirigible wheel, which may be a front wheel, is being steered in one direction for the automobile to make a turn, the front wheel is subjected to a returning force Fr that tends to move the front wheel back to its neutral position. The returning force Fr arises from front wheel alignment and also a self-aligning torque produced by elastic deformation of the front wheel. The returning force Fr is transmitted to the steering wheel as a road-induced load. The returning force Fr is low when the vehicle speed Vs is low, and increases as the vehicle speed Vs goes higher.

The above power steering system basically has two steering conditions or modes: (i) The steering torque Ts applied to the steering wheel is larger than a prescribed level. (ii) The applied steering torque Ts is substantially zero. The condition (i) includes (i-1) a positive steering state in which the direction in which the steering torque Ts is applied and the direction in which the dirigible wheel rotates are the same and (i-2) a steering wheel returning state in which the direction of the steering torque Ts and the direction of rotation of the dirigible wheel are not the same. In the state (i-1), the sum of the steering torque Ts and the output torque of the motor is larger than the road-induced load Fr. In the state (i-2), the sum of the steering torque Ts and the output motor torque is smaller than the road-induced load Fr. The condition (ii) may occur when the vehicle is running straight, for example. The steering torque Ts is also zero when substantially no steering force is applied by the driver to the steering wheel, with the driver's hands on or off the steering wheel, for some reason after the dirigible wheel has been steered a certain angle from its neutral position. When this happens, the dirigible wheel starts to return to its neutral position under the returning force F. At the same time, the steering wheel starts returning to its neutral position. This condition will hereinafter be referred to as a freely returning state of the steering wheel. This freely returning state is included in the condition (ii).

In the power steering system disclosed in the above British Patent Application, the steering angle $\theta$ in the freely returning state of the steering wheel varies as follows: It is assumed that the driver stops applying the steering force to the steering wheel when it has been turned an angle $\theta i$ clockwise, for example, from its neutral position ($\theta=0$) while the vehicle is running at a certain speed. At this time, the freely returning state of hte steering wheel is initiated. The steering wheel repeats overshooting from the neutral position until finally it settles into the neutral position. In the freely returning state of the steering wheel, the motor acts as a load on the dirigible wheel since the motor is rotated through the speed reducer from the side of the dirigible wheel. As a result, the rate of change of the steering angle per unit time is smaller than that of a manually operated steering system. Stated otherwise, the period of reciprocating angular movement of the steering wheel is longer than that in the manually operated steering wheel. Moreover, because the moment of inertia of the motor acts on the dirigible wheel at a rate proportional to the square of the speed reduction ratio of the speed reducer, the extent of overshooting of the steering wheel from the neutral position thereof is larger than that of the manually operated steering system. As a consequence, in the freely returning state of the steering wheel, the stability of returning of the steering wheel to the neutral position is lowered. This problem manifests itself in medium- and high-speed ranges inasmuch as the returning force Fr for the front wheel is larger as the vehicle speed Vs is higher. In a low-speed range, the returning force Fr is smaller in a low-speed range, and hence the returning movement of the steering wheel to its neutral position is assisted by the inertial moment of the motor, thus improving the steering wheel returning stability. As described above, if the steering torque Ts is large at a high vehicle speed, the motor is damped. However, in the freely returning state of the steering wheel, the motor is not substantially damped since the steering torque Ts applied is substantially null.

The present invention has been achieved in an effort to effectively solve the above problem of the conventional motor-driven power steering system for automotive vehicles.

SUMMARY OF THE INVENTION

It is an object of the present invention to provide an automotive motor-driven power steering system which allows a steering wheel to return to its neutral position with good characteristics in a freely returning stage of the steering wheel particularly in medium- and high-speed ranges of the automotive vehicle.

To accomplish the above object, there is provided a motor-driven power steering system for an automotive vehicle, comprising an input shaft operatively coupled to a steering wheel, an output shaft operatively coupled to a dirigible wheel, an electric motor for applying an assistive torque to the output shaft, torque detecting means for detecting a steering torque applied to the input shaft, drive control means responsive to detected signals from the torque detecting means for applying a driving signal to the electric motor, means for detecting a freely returning state of the steering wheel to generate a motor damping signal when prescribed conditions are met, means for detecting the speed of travel of the automotive vehicle, means for widening the range of the prescribed condition in response to an increase in the detected speed of travel of the automotive vehicle, and damping means responsive to the motor damping signal for damping the electric motor.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
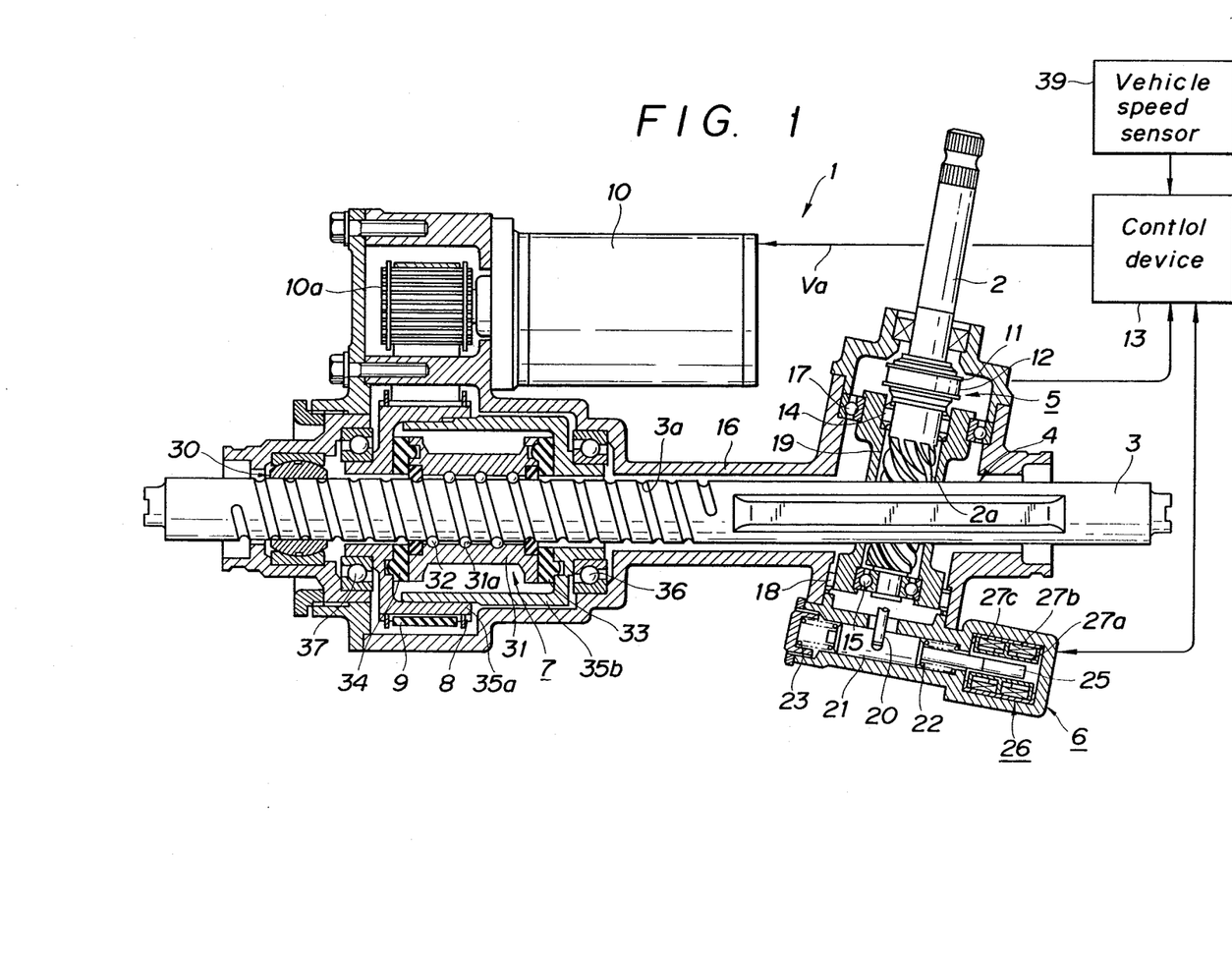
FIG. 1 is a longitudinal cross-sectional view, partly in block form, of a motor-driven power steering system for vehicles according to a first embodiment of the present invention.

FIG. 1 shows a motor-driven power steering system for vehicles such as automobiles according to a first embodiment of the present invention. The power steering system, generally designated by the reference numeral 1, has a pinion shaft 2 operatively coupled to a steering wheel (not shown) through a constant-velocity universal joint (not shown) and a steering shaft (not shown), and a rack shaft 3 having rack teeth 4 defined on its back and held in mesh with a pinion gear 2a defined on a lower portion of the pinion shaft 2. The rack shaft 3 has its opposite ends connected by tie rods (not shown) to the knuckles of dirigible or dirigible wheels (not shown). Rotation of the steering wheel is converted by the pinion shaft 2 to linear motion of the rack shaft 3. The pinion shaft 2 and the rack shaft 3 serve respectively as input and output shafts.

Around the pinion shaft 2, there are disposed a steering speed sensor 5 and a steering torque sensor 6. A DC motor 10 for generating assistive steering torque is positioned near the rack shaft 3 remotely from the rack teeth 4. The motor 10 has its output shaft supporting a toothed pulley 10a that is operatively coupled by a timing belt 9 to a larger-diameter pulley 8 disposed around the rack shaft 3. Thus, rotation of the motor 10 is transmitted via the pulley 10a and the timing belt 9 to the larger-diameter pulley 8. Rotation of the larger-diameter pulley 8 is in turn transmitted to the rack shaft 3 through a ball screw mechanism 7 disposed around the rack shaft 3. The toothed pulley 10a, the timing belt 9, the larger-diameter pulley 8, and the ball screw mechanism 7 jointly constitute a speed reducer for reducing the speed of rotation of the motor 10 and transmitting the rotation of the motor 10 at a reduced speed to the rack shaft 3 to enable the rack shaft 3 to make linear motion. The motor 10 is controlled by a control device 13, as described later on. The controlled device 13 is supplied with a detected signal from a vehicle speed sensor 39.

The steering speed sensor 5 comprises a DC generator or tachogenerator (not shown) located behind the pinion shaft 2, a smaller-diameter toothed pulley (not shown) mounted on one end of the shaft of the DC generator, a larger-diameter toothed pulley 11 mounted on the pinion shaft 2, and a timing belt 12 trained around these pulleys. The DC generator of the steering speed sensor 5 generates a DC voltage having a polarity dependent on the direction in which the pinion shaft 2 rotates and a magnitude proportional to the speed of rotation of the pinion shaft 2. The output signal from the steering speed sensor 5 is applied to the control device 13. The steering speed sensor 5 may be operatively coupled to the output shaft 3, rather than the input shaft 2.

The steering torque sensor 6 comprises a pinion holder 19 rotatably disposed around the pinion gear 2a, a piston 21 axially movable by a pin 20 integral with the pinion holder 19 in response to rotation of the pinion holder 19, a pair of springs 22, 23 disposed on opposite sides of the piston 21 for normally urging the piston 21 toward its central or neutral position, and a differential transformer 26 coupled to the piston 21 for converting axial displacement of the piston 21 to an electric signal. The pinion holder 19 is rotatably supported in a casing 16 by means of a pair of bearings 17, 18, and the pinion gear 2a is rotatably supported in the pinion holder 19 by means of bearings 14, 15. The rotational axis of the pinion gear 2a is radially displaced from the rotational axis of the pinion holder 19. When the steering wheel is in its neutral position and the steering torque Ts is zero, a straight line interconnecting the rotational axes of the pinion gear 2a and the pinion holder 19 extends substantially perpendicularly to the longitudinal axis of the rack shaft 3. In case a load on the rack shaft 3 is larger than the steering torque acting on the pinion gear 2a, the pinion gear 2a is prevented from rotating about its own axis, but the pinion holder 19 is caused to rotate, due to meshing engagement of the pinion gear 2a and the rack teeth 4. Stated otherwise, the pinion gear 2a revolves around the axis of the pinion holder 19. The rotation of the pinion holder 19 is transmitted by the pin 20 to the piston 21, which is moved in its axial direction until it counterbalances the reactive forces from the springs 22, 23. Therefore, the axial displacement of the piston 21 is proportional to the steering torque Ts applied. To one end of the piston 21, there is attached an iron core 25 serving as a magnetic body axially movable with the piston 21. Axial displacement of the iron core 25 is detected by the differential transformer 26. The differential transformer 26 comprises a primary coil 27a and a pair of secondary coils 27b, 27c. The control device 13 applies an AC voltage to the primary coil 27a, and outputs from the secondary coils 27b, 27c are supplied to the control device 13. The amplitude of the outputs from the secondary coils 27b, 27c is differentially variable with the axial displacement of the iron core 25. The outputs from the secondary coils 27b, 27c serve as signals of detected steering torque which indicate the magnitude of the steering torque Ts and the direction in which it acts.

The rack shaft 3 has a helical screw groove 3a defined on a portion thereof remote from the rack teeth 4 meshing with the pinion gear 2a. The rack shaft portion with the helical screw groove 3 is supported in the casing 16 by a spherical bearing 30 for angular movement and axial sliding movement. The ball screw mechanism 7 comprises a ball nut 31 with a helical screw groove 31a defined in its inner circumferential surface. The ball nut 31 is disposed over the helical screw groove 3a, there being a plurality of balls 32 interposed between the ball nut 31 and the rack shaft 3. The balls 32 are received in the screw grooves 3a, 31a and roll therebetween in circulating motion through a circulatory path (not shown) in the ball nut 31. Consequently, rotation of the ball nut 31 is smoothly transmitted via the balls 32 to the rack shaft 3 for linearly moving the rack shaft 3. The ball nut 31 has its opposite ends resiliently clamped between pulley cases 35a, 35b through respective resilient members 33, 34. The pulley cases 35a, 35b are rotatably supported in the casing 16 via a pair of angular contact bearings 36, 37. The larger-diameter pulley 8 is mounted on the outer circumferential surface of the pulley case 35b.

The control device 13 will be described with reference to FIG. 2.

The control device 13 includes a microcomputer unit (hereinafter referred to as an "MCU") 40. The MCU 40 is supplied with detected steering torque signals S1, S2 from a steering torque detector circuit 41, detected steering speed signals S3, S4 from a steering speed sensor 42, and a detected signal S5 from a vehicle speed detector circuit 46 through an A/D converter 43 under commands of the MCU 40.

The steering torque detector circuit 41 comprises the steering torque sensor 6, and an interface 44 for supplying the primary coil 27a of the differential transformer 26 with an AC signal that is produced by frequency-dividing clock pulses T1 in the MCU 40 and for rectifying, smoothing, and converting the outputs from the secondary coils 27b, 27c to DC voltage signals S1, S2 which serves as the detected steering torque signals.

The steering speed detector circuit 42 comprises the steering speed sensor 5 (DC generator), and an interface 45 for removing high-frequency components from the output signal produced from the output terminals of the sensor 5 to produce the detected steering speed signals S3, S4.

The vehicle speed detector circuit 46 comprises the vehicle speed sensor 39, and an interface 47 for converting the frequency of a pulse signal from the sensor 39 to a voltage signal through F/V (frequency/voltage) conversion and applying the voltage signal to the A/D converter 43. The vehicle speed sensor 49 comprises a disc 39a rotatable with a speedometer cable (not shown) and having a plurality of circumferentially spaced slits 39b, and a photocoupler 39c for detecting the passage of the slits 39b. The interface 47 supplies electric power to the photocoupler 39c and applies a DC voltage proportional to the frequency of the pulse signal from the photocoupler 39b to the A/D converter 43 as the vehicle speed signal S5.

Although not specifically shown, the MCU 40 has an I/O port, memories (RAM, ROM), a CPU, registers, and a clock generator to which clock pulses from a quartz resonator are supplied.

The MCU 40 is energized by a voltage stabilizer 52 connected via a fuse circuit 49, an ignition switch 50, and a fuse circuit 51 to an automobile-mounted battery 47. The fuse circuit 51 is connected to a relay circuit 53 having an output terminal 53a for supplying electric power to a motor driver circuit 55 (described later). The voltage stabilizer 52 has an output terminal 52a for supplying a constant voltage to the steering torque detector circuit 41, the steering speed detector circuit 42, and the vehicle speed detector circuit 46. When the ignition switch 50 is turned on, the MCU 40 starts its operation to process the signals S1 through S5 from the detector circuits 41, 42, 46 according to a program stored in the memory for applying motor driving signals T3, T4 and a motor damping signal T5 to the motor driver circuit 55. The driving signal T3 is a direction control signal indicating the direction in which the motor 10 is to rotate, and the driving signal T4 is a torque conrol signal for controlling the magnitude of an armature voltage Va. The signals T3 through T5 are control signals supplied to the motor driver circuit 55.

The motor driver circuit 55 comprises an interface 56 supplied with the control signals T3 through T5 and a bridge circuit 57 having four FETs 58, 59, 60, 61. The FETs 58 through 61 have non-illustrated internal backward diodes. The bridge circuit 57 has one output node between the source of the FET 58 and the drain of the FET 59, the output node being connected to one terminal of the motor 10, and the other output node between the source of the FET 61 and the drain of the FET 60, the other output node being connected to the other terminal of the motor 10 through a relay circuit 54. The bridge circuit 57 also has two input nodes between the drain of the FET 58 and the drain of the FET 61 and between the source of the FET 59 and the source of the FET 60, the input nodes being coupled respectively to the output terminal 53a of the relay circuit 53 and the negative terminal of the battery 48. The gates of the FETs 58, 59, 60, 61 are connected respectively to output terminals 56a, 56b, 56c, 56d of the interface 56.

The interface 56 is operated in response to the control signals T3, T4, T5 from the MCU 40 as follows. PWM signals from the output terminals 56a through 56d are signals produced by modulating the pulse duration of a rectangular pulse signal having a constant frequency and a battery level. The term "duty ratio" used hereinbelow indicates the ratio of the pulse duration of a PWM signal.

(I) Where the steering wheel is in the positive steering state:

(I - i) When the steering torque Ts acts clockwise:

The FET 58 is continuously turned on by a PWM signal, which has a duty ratio Du of 1 (one), from the output terminal 56a, whereas the FET 60 is turned on and off by a PWM signal from the output terminal 56c.

(I - ii) When the steering torque Ts acts counterclockwise:

The FET 61 is continuously turned on by a PWM signal, which has a duty ratio Du of 1 (one), from the output terminal 56d, whereas the FET 59 is turned on and off by a PWM signal from the output terminal 56b.

In each of the above cases (I - i), (I - ii), the duty ratio Dd of a PWM signal from the output terminal 56b or 56c is determined primarily on the basis of the steering torque Ts.

(II) Where the steering wheel is in the returning state:

(II - i) When the steering torque Ts acts clockwise:

The FET 58 is turned on and off by a PWM signal from the output terminal 56a which has its duty ratio Du inversely proportional to the steering speed Ns, whereas FET 60 is turned on and off by a PWM signal from the output terminal 56c.

(II - ii) When the steering torque Ts acts counterclockwise:

The FET 61 is turned on and off by a PWM signal from the output terminal 56d which has its duty ratio Du inversely proportional to the steering speed Ns, whereas FET 59 is turned on and off by a PWM signal from the output terminal 56b.

In each of the above cases (II - i), (II - ii), the duty ratio Dd of a PWM signal from the output terminal 56c or 56b is determined on the basis of the steering torque Ts.

Figures 11, 12A, 12B, 12C:
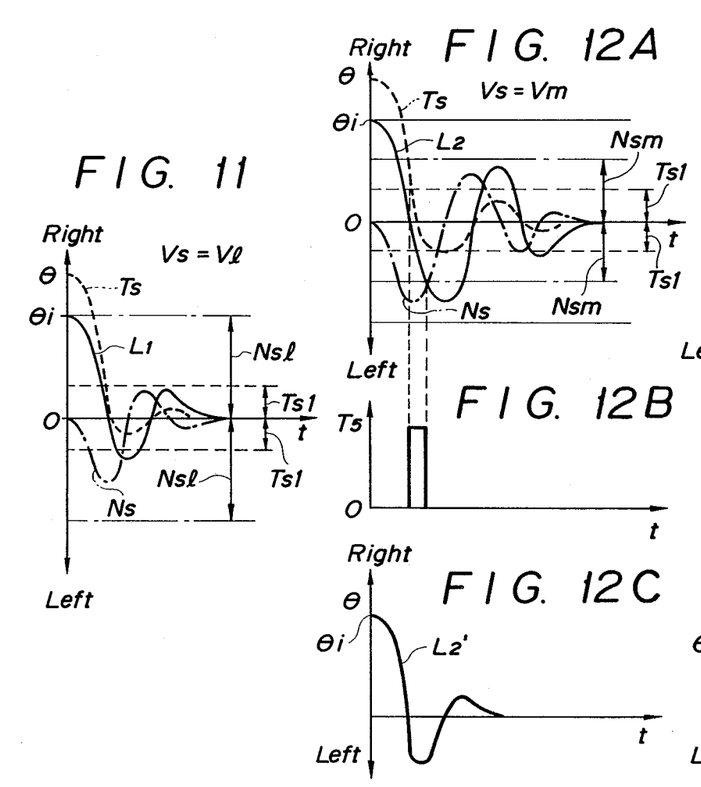
FIG. 11 is a graph showing convergent characteristics of a steering angle in the freely returning state at a low vehicle speed.
FIGS. 12A through 12C illustrate the manner in which the steering system operates in the freely returning state at a medium vehicle speed, FIG. 12A being a graph showing convergent characteristics of a normal steering angle, FIG. 12B being a graph showing the timing of generation of a motor damping signal, FIG. 12C being a graph showing convergent characteristics of a steering angle which are obtained as a result of generation of the motor damping signal shown in FIG. 12B.
Figures 13A, 13B:
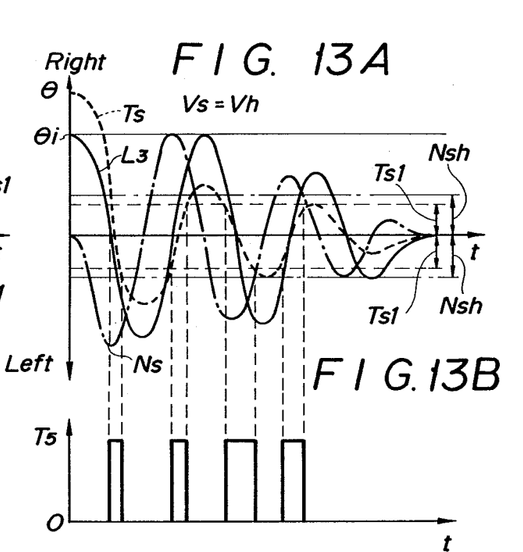
FIGS. 13A through 13C illustrate the manner in which the steering system operates in the freely returning state at a high vehicle speed, FIG. 13A being a graph showing convergent characteristics of a normal steering angle, FIG. 13B being a graph showing the timing of generation of a motor damping signal, FIG. 13C being a graph showing convergent characteristics of a steering angle which are obtained as a result of generation of the motor damping signal shown in FIG. 13B.
Figure 13C:
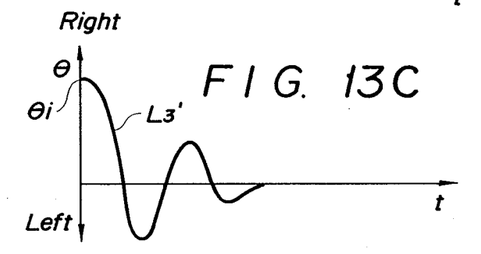

(III) Where the steering wheel is in the freely returning state:

When the steering wheel passes in the vicinity of its neutral position ($\theta=0$), the FETs 58, 61 are turned off, and the FETs 59, 60 are continuously turned on. More specifically, the duty ratios of PWM signals from the output terminals 56a, 56d are zero, and the duty ratios of PWM signals from the output terminals 56b, 56c are 1 (one). At this time, a closed circuit is formed as described later on to dampen the motor 10. According to the present invention, as described later, the steering wheel is determined as being in the freely returning state if the steering torque Ts is smaller than an upper limit Ts1 and the steering speed Ns is higher than an upper limit Nslmt (Vs). As shown in FIGS. 11 through 13, the steering torque upper limit Tsi is of a prescribed small value at all times. As illustrated in FIGS. 8, 11 through 13, the steering speed upper limit Nslmt (vs) is reduced as the vehicle speed Vs increases.

In each of the above cases (I) and (II), the average value of an armature voltage Va applied to the motor 10 is proportional to the product of the duty ratios Du, Dd of the PWM signals supplied to a pair of FETs 58, 60 or 61, 59. The control signal T3 respresents which pair of FETs is to be selected, and the control signal T3 represents the duty ratios Du, Dd for the selected FET pair. The control signal T5 indicates whether the motor 10 is to be dampened or not.

According to the above operation of the interface 56, an armature voltage Va having a desired polarity and amplitude is applied to the motor 10 in the positive steering state (I) and the steering wheel returning state (II).

If the FETs 58, 60 are driven as described above, for example, the polarity of the armature voltage Va is such that an armature current Ia flows in the direction of the arrow A to rotate the motor 10 clockwise. Conversely, if the FETs 61, 59 are driven, the polarity of the armature voltage Va is such that an armature current Ia flows in the direction of the arrow B to rotate the motor 10 counterclockwise.

In the event of a failure of the control device 13, the relay circuits 53, 54 are supplied with a relay control signal T2 and opened thereby, so that the motor 10 is electrically disconnected from the motor driver circuit 55, and the motor drive circuit is electrically severed from the power supply.

Operation of the MCU 40 will be described below.

Figure 3:
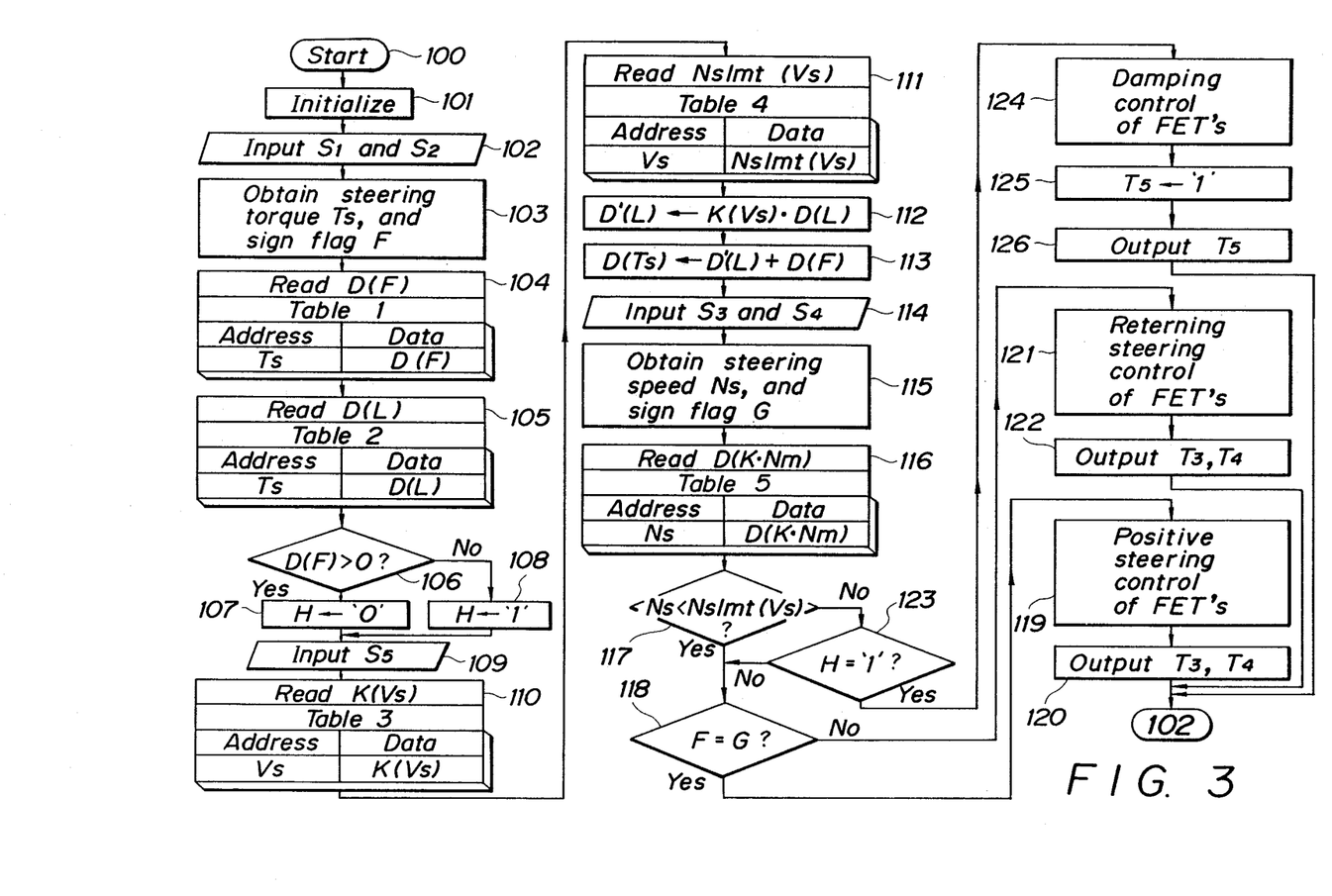
FIG. 3 is a flowchart of a basic operation sequence executed by a microcomputer unit in the control device.

FIG. 3 is a flowchart schematically showing a control sequence to be executed by the MCU 40.

When the ignition switch 50 is turned on, the MCU 40 and the other circuits are supplied with electric power to start the control process in a step 100.

First, the data items in the registers and the RAM, the necessary circuits, and the I/O port of the MCU 40 are initialized at a step 101. The internal circuits of the MCU 40 are checked for failures while stopping reading in of input signals from the A/D converter 43. If any failure is detected, then the MCU 40 stops its operation and hence the control device 13 is inactivated. If there is no failure, then the relay control signal T2 is supplied to the relay circuits 53, 54 to make the motor driver circuit 55 and the motor 10 ready for energization.

Figure 4:
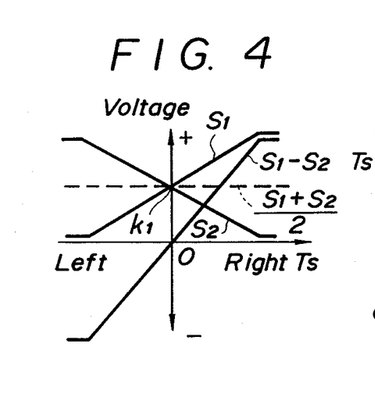
FIG. 4 is a graph showing signals of detected steering torque.

In a step 103, the steering torque signals S1, S2 are successively read into the MCU 40. Since the steering torque sensor 6 includes the differential transformer 26, the output signals S1, S2 from the steering torque sensor 6 can be plotted as shown in FIG. 4 if the steering torque detector circuit 41 is normal. FIG. 4 indicates that half of the sum of the signals S1, S2 is of a substantially constant value k1. When the steering torque Ts exceeds a prescribed value in each of the clockwise and counterclockwise directions of rotation of the steering wheel, the values of the signals S1, S2 remain constant as shown in FIG. 4 since the angle of rotation of the input shaft 2 and the axial displacement of the output shaft 3 are limited to certain ranges, respectively.

In a step 103, the difference (S1−S2) is calculated and regarded as the value of steering torque Ts. Then, it is ascertained whether the value of Ts is positive or negative in order to determine the direction in which the steering torque Ts acts. If the steering torque acts in the clockwise direction, i.e., if it is positive or zero, then a steering torque direction flag F is set to "1". If the steering torque Ts is of a negative value, then the flag F is reset to "0" and the value of the steering torque Ts is converted to its absolute value (Ts=−Ts).

Figure 5:
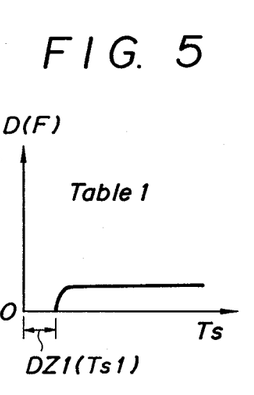
FIG. 5 is a graph showing the relationship between the steering torque and the duty ratio for a friction loss.
Figure 6:
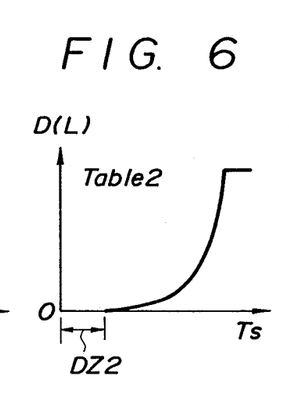
FIG. 6 is a graph showing the relationship between the steering torque and the duty ratio for a road-induced load.

In each of steps 104, 105, data items of tables 1, 2 stored in the ROM (not shown) are directly read by being addressed by the absolute value of the steering torque Ts. More specifically, the ROM stores a table 1 storing duty ratios D (F) for a friction loss of the system which are related to the steering torque Ts as shown in FIG. 5, and a table 2 storing duty ratios D (L) for a road-induced load which are related to the steering torque Ts as shown in FIG. 6. Denoted in FIGS. 5 and 6 at DZ1, DZ2 are dead zones. The duty ratio D (F) is regarded as a component, corresponding to the friction loss, of the armature voltage Va applied to the motor 10, whereas the duty ratio D (L) is regarded as a component, corresponding to Ia·Ra, of the armature voltage Va, where Ia and Ra are the armature current and internal resistance, respectively, of the motor 10. Actually, the absolute value of the steering torque is multiplied, and data items of the tables 1, 2 are read by being addressed by an integral part of the product. This holds true for subsequent steps 110, 111, 116.

A step 106 ascertains whether the duty ratio D (F) read in the step 104 is larger than zero or not. The width of the dead zone DZ1 shown in FIG. 5 is equal to the upper limit Ts1 of the steering torque Ts which will be described later on with reference to FIGS. 11, 12A, 13A. The upper limit Ts1 is one of conditional values for determining the freely returning state of the steering wheel. Therefore, the step 104 indirectly ascertains whether the steering torque Ts is smaller than the upper limit Ts or not.

If D (F) is larger than zero, then a flag H is reset to "0" in a step 107, and if not, then the flag H is set to "1" in a step 108. The flag H indicates whether the steering torque Ts is smaller than the upper limit Ts1 or not, and is used in a step 123 as a condition for determining the freely returning state of the steering wheel. The processing of the steps 106 through 108 may be executed by using the duty ratio D (L) read in the step 105.

In a step 109, the detected signal S5 from the vehicle speed detector circuit 46 is read in to find the vehicle speed Va. Although not shown, the voltage value of the detected signal T5 is proportional to the vehicle speed Vs.

In each of steps 110, 111, data items of tables 3, 4 stored in the ROM (not shown) are directly read by being addressed by the value of the vehicle speed Vs. More specifically, the ROM stores a table 3 storing corrective coefficients K (Vs) which are related to the vehicle speed Vs as shown in FIG. 7, and a table 4 storing steering speed upper limits Nslmt (Vs) which are related to the vehicle speed Vs as shown in FIG. 8.

Figure 7:
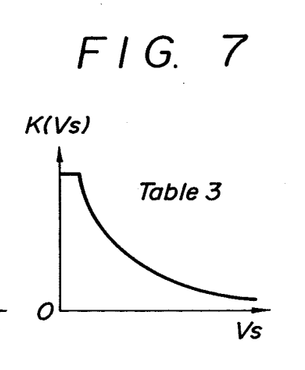
FIG. 7 is a graph showing the relationship between the vehicle speed and a coefficient for correcting the duty ratio of FIG. 6.
Figure 8:
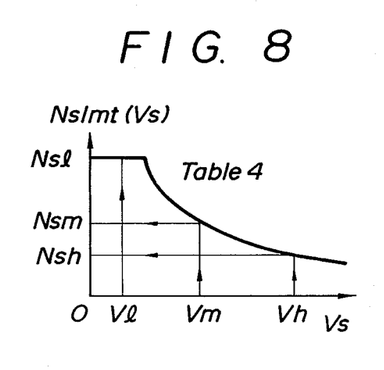
FIG. 8 is a graph showing the relationship between the vehicle speed and an upper steering speed limit for determining a freely returning state of the steering wheel.

The corrective cofficient K (Vs) shown in FIG. 7 decreases as the vehicle speed Vs increases. The steering speed upper limit Nslmt (Vs) in FIG. 8 is of a constant value Nsl at a low vehicle speed, and is progressively reduced as the vehicle speed Vs is rises from a medium vehicle speed to a high vehicle speed. Denoted at Vl, Vm, Vh are typical low, medium, and high vehicle speeds, and at Nsm, Nsh are upper limits corresponding to the vehicle speeds Vm, Vh.

In a step 112, the duty ratio D (L) for a roadinduced load is multiplied by the corrective coefficient K (Vs) and the sum is used as a corrected duty ratio D' (L) for the road-inducedload. Therefore, the duty ratio D' (L) with respect to a certain steering torque is reduced as the vehicle speed Vs goes higher.

In a step 113, D (F)+D' (L) is computed and the sum is stored as a duty ratio D (Ts) for the steering torque. The duty ratio D (Ts) is also reduced as the vehicle speed Vs increases.

In a step 114, the detected signals S3, S4 from the steering speed detector circuit 42 are read into the MCU 40. In a step 115, the difference (S3−S4) is calculated and regarded as the value of steering speed Ns. Then, it is ascertained whether the value of Ns is positive or negative in order to determine the direction of the steering speed Ns. If the steering speed Ns in the clockwise direction, i.e., if it is positive or zero, then a steering speed flag G is set to "1". If the steering speed Ns is of a negative value, then the flag G is reset to "0" and the value of the steering speed Ns is converted to its absolute value (Ns=−Ns).

Figure 10:
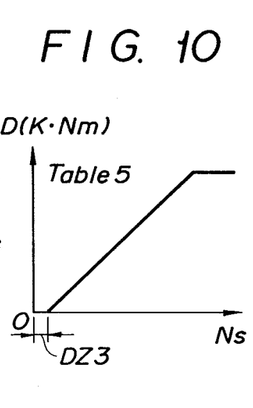
FIG. 10 is a graph showing the relationship between the steering speed and the duty ratio for an induced voltage of a motor.

In a step 116, a data item of a table 5 stored in the ROM (not shown) is directly read by being addressed by the absolute value of the steering speed Ns. More specifically, the ROM stores a table 5 storing duty ratios D (K·Nm)) for an induced voltage K·Nm of the motor 10 which are related to the absolute value of the steering speed Ns as shown in FIG. 10. Denoted in FIG. 10 at DZ3 is a dead zone, at K is an induced voltage constant of the motor 10, and Nm is the rotational speed of the motor 10. Therefore, the duty ratio D (K·Nm) addressed by the absolute value of the steering speed Ns is read out in the step 116. In this connection, the armature voltage Va and the armature current Ia of the motor 10 are of the relationship: Vs=Ia·Ra+K·Nm, where Ra is the internal resistance of the motor 10. Rotation of the the motor 10 is transmitted to the output shaft 3 through the speed reducer 10a, 9, 8, 7, and the speed reduction ratio of the speed reducer is substantially constant. Therefore, the induced voltage K]Nm of the motor 10 is determined on the steering speed Ns. The duty ratio D (K·Nm) is regarded as a component, corresponding to the steering speed Ns, of the armature voltage Va.

Then, a step 117 ascertains whether the steering speed Ns is smaller than the upper limit Nslmt (Vs) found in the step 111, or not. If smaller, then control goes to a step 118, and if not, then control goes to a step 123.

The step 123 ascertains whether the flag H determined in the steps 106–108 is "1" or not. If "1", then control proceeds to a step 124, and if not, then control goes to the step 118.

When control goes to the step 124, the steering speed Ns is larger than the upper limit Nslmt (Vs) and the steering torque Ts is smaller than the upper limit Ts1. In this case, according to this embodiment, the steering wheel is determined as being in the freely returning state (III). When control goes to the step 118, the steering wheel is determined as being in the positive steering state (I) or the returning state (II).

The step 118 ascertains whether the steering torque direction F and the steering speed direction flag G are equal to each other or not in order to check if the steering wheel is in the positive steering state (I) or the returning state (II). If F=G, i.e., if F=G="1" or F=G="0", then control goes to the step 119. At this time, since the direction in which the steering torque Ts is applied and the direction of the steering speed Ns are the same, the steering wheel is determined as being in the positive steering state (I). If F is not equal to T, i.e., if F="1" and G="0" or F="0" and G="1", then control goes to a step 121. At this time, since the direction in which the steering torque Ts is applied and the direction of the steering speed Ns do not coincide, the steering wheel is determined as being in the returning state (II).

The step 119 effects a control operation to achieve the above-mentioned state (I - i) or (I - ii) according to the content of the the steering torque direction flag F. More specifically, 1 (one) is put into the duty ratio Du for a PWM signal to be applied to the upper FET 58 or 61, and D (Ts)+D (K·Nm) is put into the duty ratio Dd for a PWM signal to be applied to the lower FET 60 or 59. Then, such duty ratios Du, Dd are applied in the form of the driving signals T3, T4 to the motor driver circuit 55 in a step 120, from which control goes to the step 102.

The step 121 effects a control operation to achieve the above-mentioned state (II - i) or (II - ii) according to the content of the the steering torque direction flag F. More specifically, 1−D (K·Nm) is put into the duty ratio Du for a PWM signal to be applied to the upper FET 58 or 61, and D (Ts) is put into the duty ratio Dd for a PWM signal to be applied to the lower FET 60 or 59. Then, such duty ratios Du, Dd are applied in the form of the driving signals T3, T4 to the motor driver circuit 55 in a step 122, from which control goes to step 102.

The processing in the steps 119, 120, and 121, 122 is a normal control process for the motor 10. The motor 10 is rotated in a prescribed direction to reduce manually applied steering forces. Since D (Ts) decreases as the vehicle speed Vs increases as described above with respect to the step 113, the torque generated by the motor 10 is generally reduced as the vehicle speed Vs goes higher. Therefore, the assistive torque applied to the rack shaft 3 becomes smaller as the vehicle speed Vs is increased, thus giving the driver a good road feel through the steering wheel.

As described later on, even if the steering wheel is really in the freely returning state (III), there are occasions where the steering speed Ns is smaller than the upper limit Nslmt (Vs) established at the time, at a low vehicle speed. In such a case, control goes from the step 117 via the step 118 to the step 119 or 121. In the freely returning state (III), the steering torque Ts is extremely small, and the duty ratio D (Ts) is virtually zero (see FIGS. 5 and 6). When the steering speed Ns is low, the duty ratio D (K·Nm) is also virtually zero (FIG. 10). Therefore, the duty ratio Dd established in either of the steps 119, 121 is virtually zero. As a result, the armature voltage Va applied to the motor 10 is virtually zero, and the motor 10 is not driven. Consequently, the steering wheel starts returning to the neutral position due to the inertia of the motor 10; so that the steering wheel can be returned to its neutral position with improved stability.

The steps 124, 125 effect a control operation to achieve the above-mentioned state (III), as described above. More specifically, the duty ratio Du for a PWM signal to be applied to the FET 58 or 61 is set to zero, and the duty ratio Dd for a PWM signal to be applied to the FET 60 or 59 is set to 1 (one). The setting of the damping signal T5 in the step 125 corresponds to this control operation. Then, such duty ratios Du, Dd are applied in the form of the driving signal T5 to the motor driver circuit 55 in a step 122, from which control goes to the step 102.

When the damping signal T5 produced by the steps 124 through 126 is issued, the FETs 58, 61 are not driven, but the FETs 59, 60 are continuously turned on. Therefore, there are simultaneously formed two closed circuits which short-circuit the input terminals of the motor 10 in both directions. Since the steering wheel is in the freely returning state, the motor 10 is rotated from the side of the dirigible wheels. A current Ia' flows through the closed circuits due to an electromotive force generated by rotation of the motor 10 itself. When such a current Ia' flows, the dirigible wheels perform work on the motor 10. Thus, the dirigible wheels and the steering wheel are dampened. The current Ia' is proportional to the rotational speed Nm of the motor 10. As described above, each of the EFTs 59, 60 has an internal backward diode (not shown). The closed circuits are constituted by:

(1) the relay circuit 54 - FET 60 (as turned on) - the internal diode of the FET 59; and (2) the FET 59 (as turned on) - the internal diode of the FET 60 - the relay circuit 54, as named in the direction of the current Ia'. Therefore, the current Ia' can flow irrespective of which direction the motor 10 is rotated in.

FIGS. 11, 12A, 13A show curves L1, L2, L3 which indicate how the steering angle θ varies in the freely returning state of the steering wheel when the vehicle speed Vs is the low vehicle speed Vl, the medium vehicle speed Vm, and the high vehicle speed Vh, respectively, in FIG. 8, and the damping signal T5 is not issued. The vertical and horizontal axes of each of these graphs represent the steering angle θ and time t. As a common condition, the driver stops applying a steering force to the steering wheel when the steering wheel is turned θi clockwise from its neutral position (θ=0). At each vehicle speed, the steering wheel repeats overshooting from the neutral position until finally it returns to the neutral position. Denoted at Ts1 is the upper limit for the steering torque Ts described with respect to the step 106, the upper limit being a relatively small constant. Denoted at Nsl, Nsm, Nsh are respective values of the steering speed upper limit Nslmt (Vs) which correspond to the vehicle speeds Vl, Vm, Vh, respectively.

According to the processing of FIG. 3, particularly the processing of the steps 106–108, 111, 117, 123–126, the steering wheel is determined as being in the freely returing state and the damping signal T5 is issued insofar as the conditions Ts<Ts and Ns>Nslmt (Vs) are met. As can be understood from FIG. 11, the above conditions are not met and the damping signal T5 is not issued when Vs=Vl. In this case, control goes to the step 121, but the stability of returning movement of the steering wheel to the neutral position is improved, as described above. As can be understood from FIGS. 12A and 12A, the above conditions are met and the damping signal T5 is issued as shown in FIGS. 12B and 13B when Vs=Vm and Vs=Vh. As a consequence, the steering angle θ actually varies as indicated by the curve L2' in FIG. 12C and the curve L3' in FIG. 13C. The time required for the steering wheel to settle into the neutral position is shortened as is the case when the vehicle runs at a low speed.

In the steering system 1, the steering wheel is determined as being in the freely returning state and the damping signal T5 is issued when the conditions of Ts<Ts1 and Ns>Nslmt (Vs) are met. Therefore, the extent of overshooting of the steering wheel from the neutral position is reduced to allow the steering wheel to return to the neutral position with good characteristics. Practically, the damping signal T5 is issued when the steering wheel passes in the vicinity of the neutral position (θ=0) as shown in FIGS. 12B and 13B, so that the dirigible wheel and the steering wheel can effectively dampened. Moreover, as illustrated in FIG. 8, the steering speed upper limit Nslmt (Vs) is established such that it is kept at a constant value Nsl when the vehicle speed is low and is progressively lowerd as the vehicle speed increases from a medium speed to a high speed. Thus, the above conditions become less strict as the vehicle speed Vs goes higher. Stated otherwise, the range of the above conditions is widened upon an increase in the vehicle speed Vs. As the vehicle speed Vs increases, the freely returning state of the steering wheel can be detected more easily. As a consequence, the steering wheel returns to the neutral position with good characteristics in the freely returning state particularly at medium and high vehicle speeds.

Figure 2:
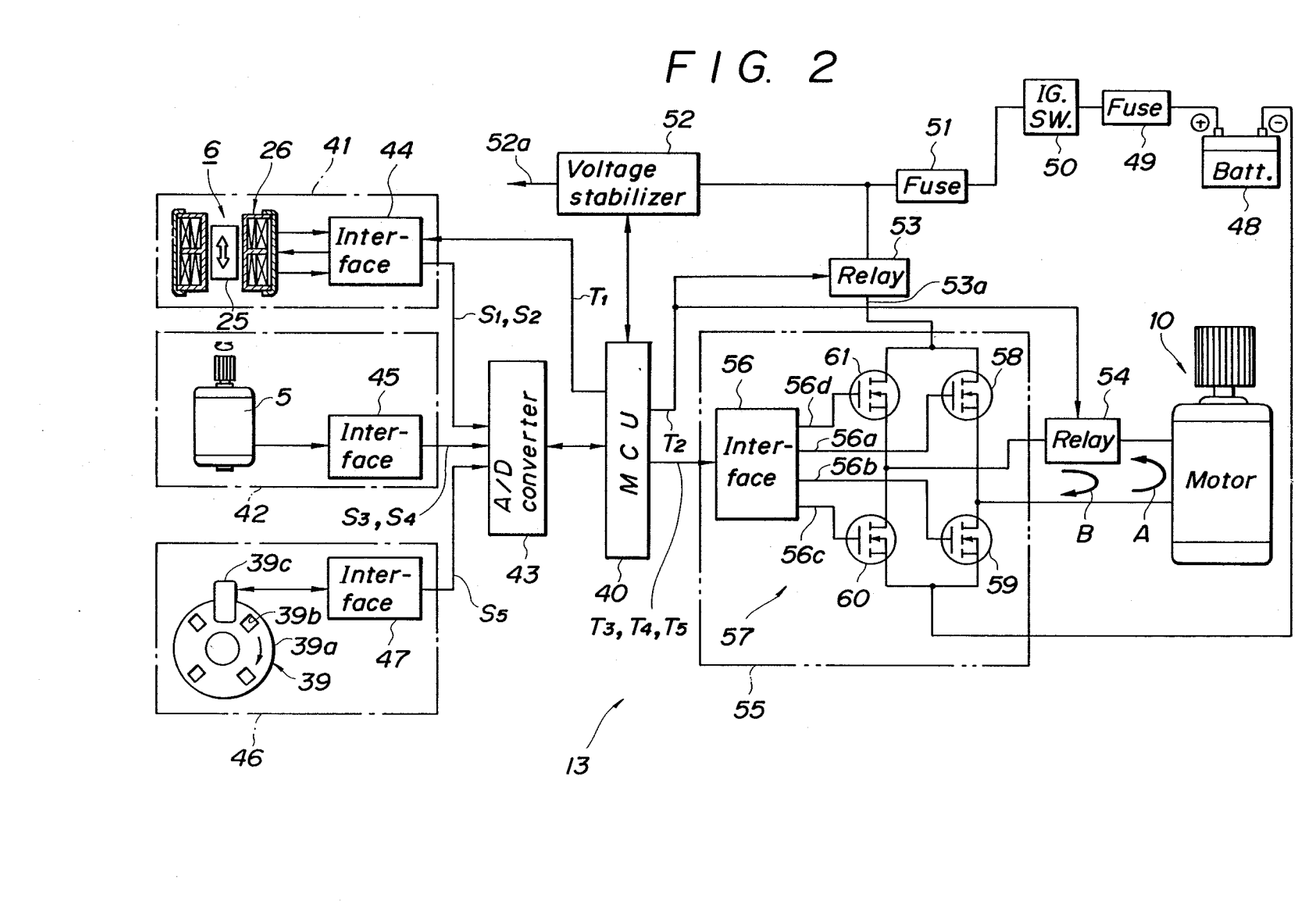
FIG. 2 is a block diagram of a control device of the motor-driven power steering system shown in FIG. 1.
Figure 14:
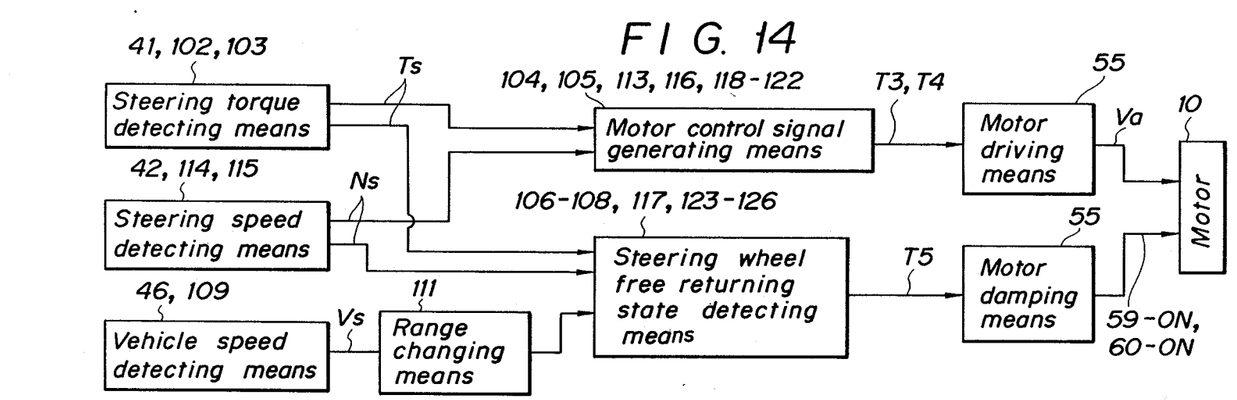
FIG. 14 is a functional block diagram of the control device illustrated in FIG. 3.

FIG. 14 shows in block form the basic functions of the control device 13 by relating the various components of the control device 13 shown in FIG. 2 to the steps of the flowcharts of FIG. 3, with the means for determining a corrective coefficient K (Vs) dependent on the vehicle speed being omitted from illustration.

In the above embodiment, the steering speed upper limit Nslmt (Vs) is lowered as the vehicle speed Vs increases. However, the upper limit for the steering speed Ns may be held constant and only the upper limit for the steering torque Ts may be increased as the vehicle speed Vs goes higher. Moreover, as the vehicle speed Vs increases, the upper limit for the steering speed Ns may be reduced and the upper limit for the steering torque Ts may be increased. Instead of continuously turning on the lower FETs 59, 60 with the damping signal T5, the upper FETs 58, 61 may continuously be turned on. Furthermore, since the steering wheel and the motor 10 are substantially mechanically interconnected, the above processing may be achieved by detecting the rotational speed Nm of the motor 10 rather than the steering speed Ns.

A motor-driven power steering system 200 for an automotive vehicle according to a second embodiment will be described with reference to FIGS. 15 through 18. The power steering system 200 includes a sensor 201 for detecting the rotational speed Nm of the motor 10, instead of the steering speed sensor 5 of the system shown in FIG. 1. The rotational speed Nm of the motor 10, rather than the rotational speed Nm of the steering wheel, is utilized because the motor 10 and the steering wheel are simultaneously rotated by the dirigible wheels while the steering wheel is in the freely returning state.

Figures 15, 16:
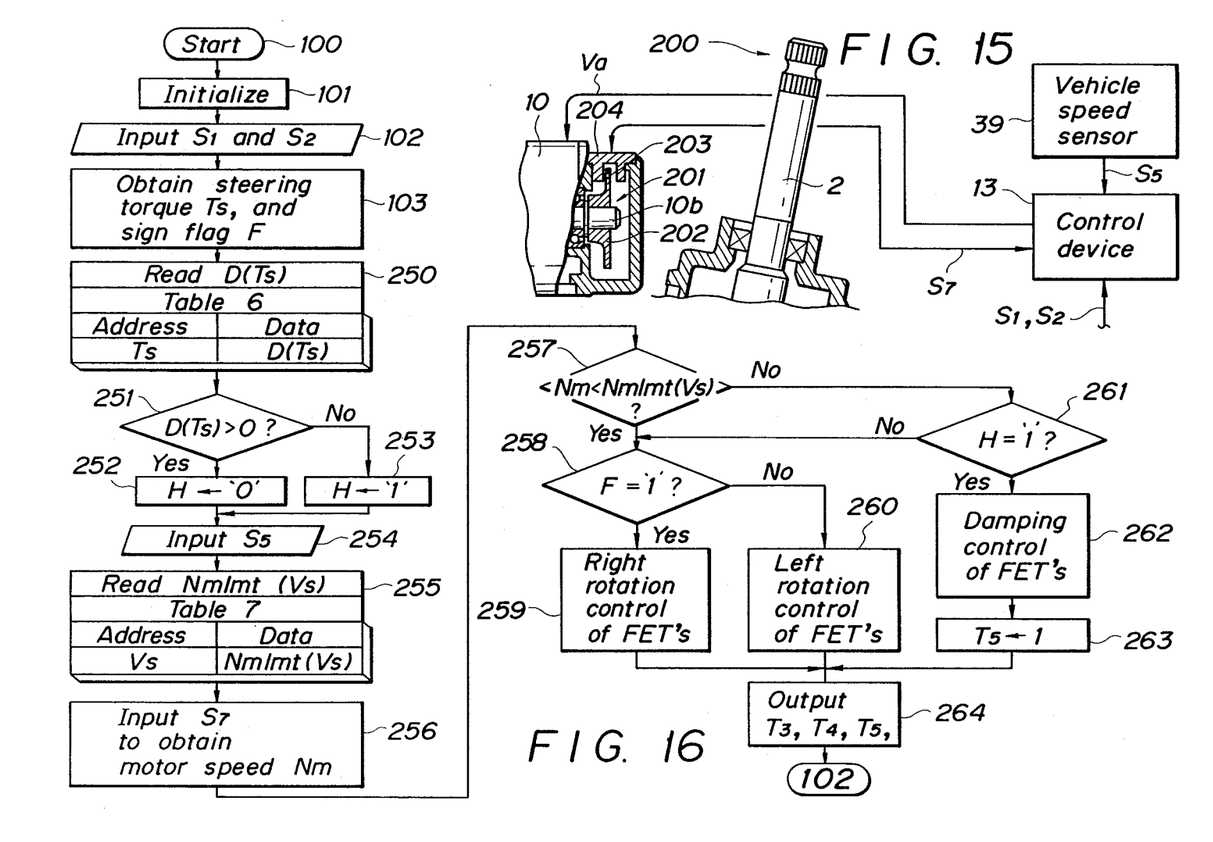
FIG. 15 is a fragmentary view of a motor-driven power steering system according to a second embodiment of the present invention.
FIG. 16 is a flowchart of a control sequence executed in the second embodiment.

The sensor 201 comprises a disk 202 fixed to one end of the rotatable shaft 10b of the motor 10 and having a slit 203, and a photocoupler 204 for detecting light that has passed through the slit 203 of the disk 202. The photocoupler 204 applies a pulse signal S7 having a frequency dependent on the rotational speed Nm of the motor 10 to the control device 13. The pulse signal S7 is then delivered via a frequency-to-voltage converter (not shown) to the MCU 40. The pulse signal S7 is therefore a signal indicative of the detected motor speed. The sensor 201 may be replaced with a known speed sensor for detecting the rotational speed of the motor 10.

FIG. 16 shows a flowchart of a control sequence executed by the MCU 40 of the control device 13 in the system 200. Those steps of the flowchart of FIG. 16 which are identical to the steps of FIG. 3 are denoted by identical reference numerals, and will not be described.

Figure 17:
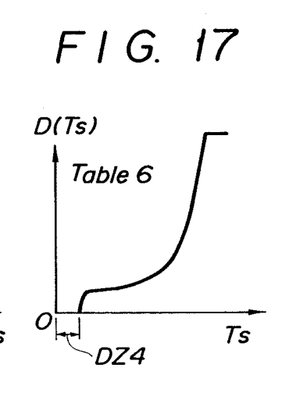
FIG. 17 is a graph showing the relationship between the steering torque and the duty ratio for the steering torque.

In a step 250, a data item stored in the non-illustrated ROM is directly read by being addressed by the absolute value of the steering torque Ts. The ROM stores a table 6 storing duty ratios D (Ts) which are related to steering torques Ts as shown in FIG. 17. The duty ratio D (Ts) is the sum of the duty ratio D (F) of FIG. 5 and the duty ratio D (L) of FIG. 6. Denoted at DZ4 in FIG. 17 is a dead zone.

A step 251 then ascertains whether the duty ratio D (Ts) read in the step 250 is larger than zero or not. The width of the dead zone DZ4 in FIG. 17 is equal to the upper limit Ts1 for the steering torque Ts employed in the first embodiment. Therefore, the step 251 indirectly ascertains whether the steering torque Ts is smaller than the upper limit Ts1 or not.

If D (Ts) is larger than zero, then the flag H is reset to "0" in a step 252, and if not, then the flag H is set to "1" in a step 253.

Then, in a step 255, a data item stored in the non-illustrated ROM is directly read by being addressed by the value of the vehicle speed Vs. The ROM stores a table 7 storing motor speed upper limits Nmlmt (Vs) which are related to vehicle speeds Vs in the same manner as the steering speed upper limits Nslmt (Vs) shown in FIG. 8.

Figure 9:
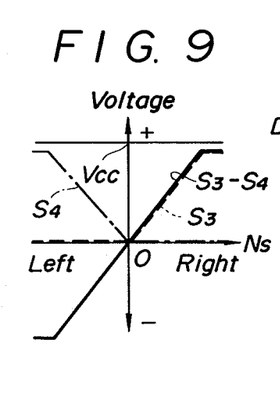
FIG. 9 is a graph showing the characteristics of a detected steering speed signal.

In a step 256, the detected signal S7 from the motor speed sensor 201 is read in to determine the motor speed Nm. Although not shown, the signal S7 has the same output characteristics as those of the detected steering speed signals S3, S4 as shown in FIG. 9.

A step 257 ascertains whether the motor speed Nm is smaller than the upper limit Nmlmt (Vs) determined in the step 255. If smaller, then control goes to a step 258, and if not, then control goes to a step 261.

The step 261 ascertains whether the flag H determined in the steps 251–253 is "1" or not. If "1", control proceeds to a step 262, and if not, then control goes to the step 258.

When control goes to the step 262, the condition that the motor speed Nm is higher than the upper limit Nmlmt (Vs) and the steering torque Ts is smaller than the upper limit Ts1 is met. In such case, the steering wheel is determined as being in the freely returning state according to the second embodiment.

The step 258 ascertains whether the steering torque direction flag F is "1" or not so as to determine the direction in which the steering torque Ts acts. If "1", then control goes to a step 259, and if not, then control goes to a step 260.

In the step 259, the control signals T3, T4 are set based on the duty ratio D (Ts) in order to rotate the motor 10 clockwise. Specifically, 1 (one) is put into the duty ratio Du for a PWM signal to be applied to the FET 58, and D (Ts) is put into the duty ratio Dd for a PWM signal to be applied to the FET 60.

In the step 260, the control signals T3, T4 are set based on the duty ratio D (Ts) in order to rotate the motor 10 counterclockwise. Specifically, 1 (one) is put into the duty ratio Du for a PWM signal to be applied to the FET 61, and D (Ts) is put into the duty ratio Dd for a PWM signal to be applied to the FET 59.

Steps 262, 263 execute the same processing as that of the steps 124, 125.

The steps 259, 260, 263 are followed by a step 264 in which the signals T3, T4, T5 are issued. Control goes from the step 264 to the step 102.

Figure 18:
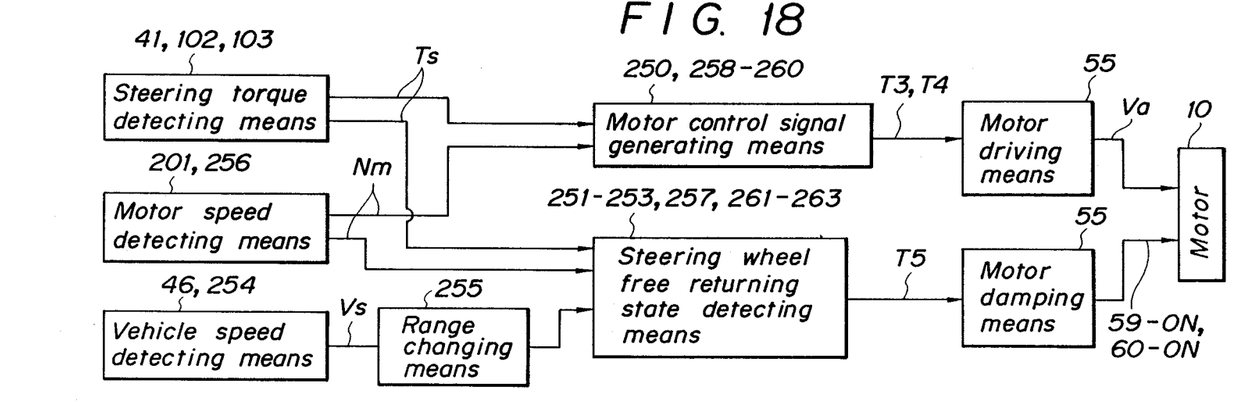
FIG. 18 is a functional block diagram of a control device in the second embodiment.

FIG. 18 shows in block diagram the basic functions of the MCU 40 of the control device 13 in the steering system 200.

In the system 200, the motor speed upper limit Nmlmt (Vs) is established such that it is kept constant at a low vehicle speed and is progressively lowered as the vehicle speed Vs increases from a medium speed to a high speed. Therefore, the conditions Ts<Ts1 and Nm>Nmlmt (Vs) for detecting the freely returning state of the steering wheel become less strict as the vehicle speed Vs rises. Thus, the range of the above conditions is widened as the vehicle speed Vs increases, and as the vehicle speed Vs goes higher, the freely returning state of the steering wheel can be detected more easily. As a result, the steering wheel can be returned to the neutral position with good characteristics in the freely returning state particularly at medium and high vehicle speeds, as with the steering system 1.

The steering system 200 can be modified in the same manner as the steering system 1. Moreover, since the steering wheel and the motor 10 are substantially mechanically interconnected, the above processing can be achieved by employing the steering speed Ns rather than the motor speed Nm.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor-driven power steering system for an automotive vehicle, comprising:
    an input shaft coupled to a steering wheel;
    an output shaft coupled to a dirigible wheel;
    an electric motor applies an assistive torque to said output shaft;
    steering torque detecting means for detecting a steering torque applied to said input shaft;
    drive control means, responsive to detected signals from said steering torque detecting means, for applying a driving signal to said electric motor;
    freely returning state detecting means for detecting a freely returning state of said steering wheel to generate a motor damping signal when prescribed conditions are met;
    speed detecting means for detecting the speed of travel of the automotive vehicle;
    widening range means for widening the range of the prescribed conditions for detecting the freely returning state of said steering wheel in response to an increase in the detected speed of travel of the automotive vehicle; and
    damping means responsive to the motor damping signal for damping said electric motor.

2. A motor-driven power steering system according to claim 1, wherein said freely returning state detecting means comprises said steering torque detecting means and a means for detecting the rotational speed of said steering wheel, wherein said motor damping signal is generated when said prescribed conditions that said steering torque is smaller than a relatively small upper limit and said rotational speed of said steering wheel is larger than a relatively large upper limit are met, said widening range means being arranged to modify at least one of said upper limits and widen the range of said prescribed conditions as said speed of travel of the automotive vehicle increases.

3. A motor-driven power steering system according to claim 2, wherein said widening range means is arranged to reduce said upper limit for the rotational speed of said steering wheel as said speed of travel of the automotive vehicle increases.

4. A motor-driven power steering system according to claim 1, wherein said electric motor is mechanically coupled to said dirigible wheel and said steering wheel, said freely returning state detecting means comprising said steering torque detecting means and a means for detecting the rotational speed of said electric motor, wherein said motor damping signal is generated when said prescribed conditions that said steering torque is smaller than a relatively small upper limit and said rotational speed of said electric motor is larger than a relatively large upper limit are met, said widening range means being arranged to modify at least one of said upper limits and widen the range of said prescribed conditions as said speed of travel of the automotive vehicle increases.

5. A motor-driven power steering system according to claim 4, wherein said widening means means for is arranged to reduce said upper limit for the rotational speed of said electric motor as said speed of travel of the automotive vehicle increases.

* * * * *